(12) United States Patent
Lasch et al.

(10) Patent No.: US 7,124,955 B2
(45) Date of Patent: Oct. 24, 2006

(54) COMPACT OR CONVENIENT TRANSACTION CARDS

(75) Inventors: Ellen Lasch, New York, NY (US); Lisa Ann Morrill Webb, Darien, CT (US); Priscilla Gandel, Long Branch, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 168 days.

(21) Appl. No.: 10/436,343

(22) Filed: May 12, 2003

(65) Prior Publication Data

US 2004/0144846 A1 Jul. 29, 2004

(51) Int. Cl.
G06K 19/00 (2006.01)
(52) U.S. Cl. ...................... 235/487; 235/493
(58) Field of Classification Search ........... 235/492, 235/491, 493, 380, 441, 486, 487, 375, 382, 235/381; 283/56.107, 106, 108, 48.1; 439/325, 439/669, 668
See application file for complete search history.

(56) References Cited

U.S. PATENT DOCUMENTS

| | | | |
|---|---|---|---|
| 4,048,737 A | 9/1977 | McDermott | |
| 4,222,516 A | 9/1980 | Badet et al. | |
| 4,318,554 A | 3/1982 | Anderson et al. | |
| 4,581,523 A * | 4/1986 | Okuno | 235/479 |
| 4,643,452 A | 2/1987 | Chang | |
| 4,849,617 A | 7/1989 | Ueda | |
| 4,957,311 A * | 9/1990 | Geisenheimer | 283/56 |
| 5,004,899 A * | 4/1991 | Ueda | 235/492 |
| 5,015,830 A * | 5/1991 | Masuzawa et al. | 235/441 |
| 5,096,228 A | 3/1992 | Rinderknecht | |
| 5,171,039 A | 12/1992 | Dusek | |
| 5,192,947 A | 3/1993 | Neustein | |
| 5,308,121 A | 5/1994 | Gunn | |
| 5,503,434 A | 4/1996 | Gunn | |
| 5,506,395 A * | 4/1996 | Eppley | 235/486 |
| 5,572,815 A | 11/1996 | Kovner | |
| 5,575,094 A * | 11/1996 | Leake et al. | 40/124.09 |
| 5,577,609 A * | 11/1996 | Hexter, Jr. | 206/449 |
| 5,700,037 A * | 12/1997 | Keller | 283/107 |
| 5,710,421 A * | 1/1998 | Kokubu | 235/492 |
| 5,791,474 A | 8/1998 | Hansen | |
| 5,844,230 A | 12/1998 | Lalonde | |
| 5,865,470 A | 2/1999 | Thompson | |
| 5,924,624 A * | 7/1999 | Martin | 229/71 |
| 5,936,227 A | 8/1999 | Trüggelmann et al. | |
| 5,979,942 A * | 11/1999 | Ivicic | 283/117 |
| 6,006,988 A | 12/1999 | Behrmann et al. | |
| 6,024,385 A | 2/2000 | Goda | |
| 6,025,283 A * | 2/2000 | Roberts | 442/15 |
| 6,050,605 A | 4/2000 | Mikelionis et al. | |
| 6,086,971 A | 7/2000 | Haas et al. | |
| 6,116,655 A | 9/2000 | Thouin et al. | |

(Continued)

FOREIGN PATENT DOCUMENTS

EP 0 735 505 10/1996

(Continued)

*Primary Examiner*—Thien M. Le
(74) *Attorney, Agent, or Firm*—McDermott Will & Emery LLP

(57) ABSTRACT

Compact or convenient transaction cards comprising protective sleeves for full-sized and smaller-sized cards, cut lines and rotatable means for forming "fanned" cards, rollable cards, collapsible cards, cards having hinges or axes for rotating parts to form full-sized cards from smaller-sized cards, housings for having lights and sounds emanating therefrom, and the like are provided.

9 Claims, 17 Drawing Sheets

U.S. PATENT DOCUMENTS

| | | |
|---|---|---|
| 6,197,396 B1 | 3/2001 | Haas et al. |
| 6,315,206 B1 | 11/2001 | Hansen et al. |
| D453,160 S | 1/2002 | Pentz et al. |
| D453,161 S | 1/2002 | Pentz |
| D453,337 S | 2/2002 | Pentz et al. |
| D453,338 S | 2/2002 | Pentz et al. |
| D453,516 S | 2/2002 | Pentz |
| D454,910 S | 3/2002 | Smith et al. |
| D457,556 S | 5/2002 | Hochschild |
| D460,455 S | 7/2002 | Pentz |
| D461,477 S | 8/2002 | Pentz |
| D462,965 S | 9/2002 | Pentz |
| D462,966 S | 9/2002 | Pentz et al. |
| 6,471,127 B1 | 10/2002 | Pentz et al. |
| 6,481,623 B1* | 11/2002 | Grant et al. ............... 235/449 |
| 6,732,090 B1* | 5/2004 | Shanahan et al. ............ 707/3 |
| 6,751,805 B1* | 6/2004 | Austion .......................... 2/94 |
| 6,916,128 B1* | 7/2005 | Petteruti et al. ............ 400/88 |
| 2001/0022446 A1 | 9/2001 | Klure |
| 2002/0040935 A1 | 4/2002 | Weyant |
| 2002/0041093 A1 | 4/2002 | Cox et al. |
| 2002/0125164 A1* | 9/2002 | Bassinson .................. 206/438 |
| 2002/0153410 A1* | 10/2002 | Santini ...................... 235/375 |
| 2003/0132132 A1* | 7/2003 | Small ........................ 206/449 |
| 2004/0169087 A1* | 9/2004 | Lasch et al. ............... 235/493 |

FOREIGN PATENT DOCUMENTS

| | | |
|---|---|---|
| GB | 2 281 714 | 3/1995 |

* cited by examiner

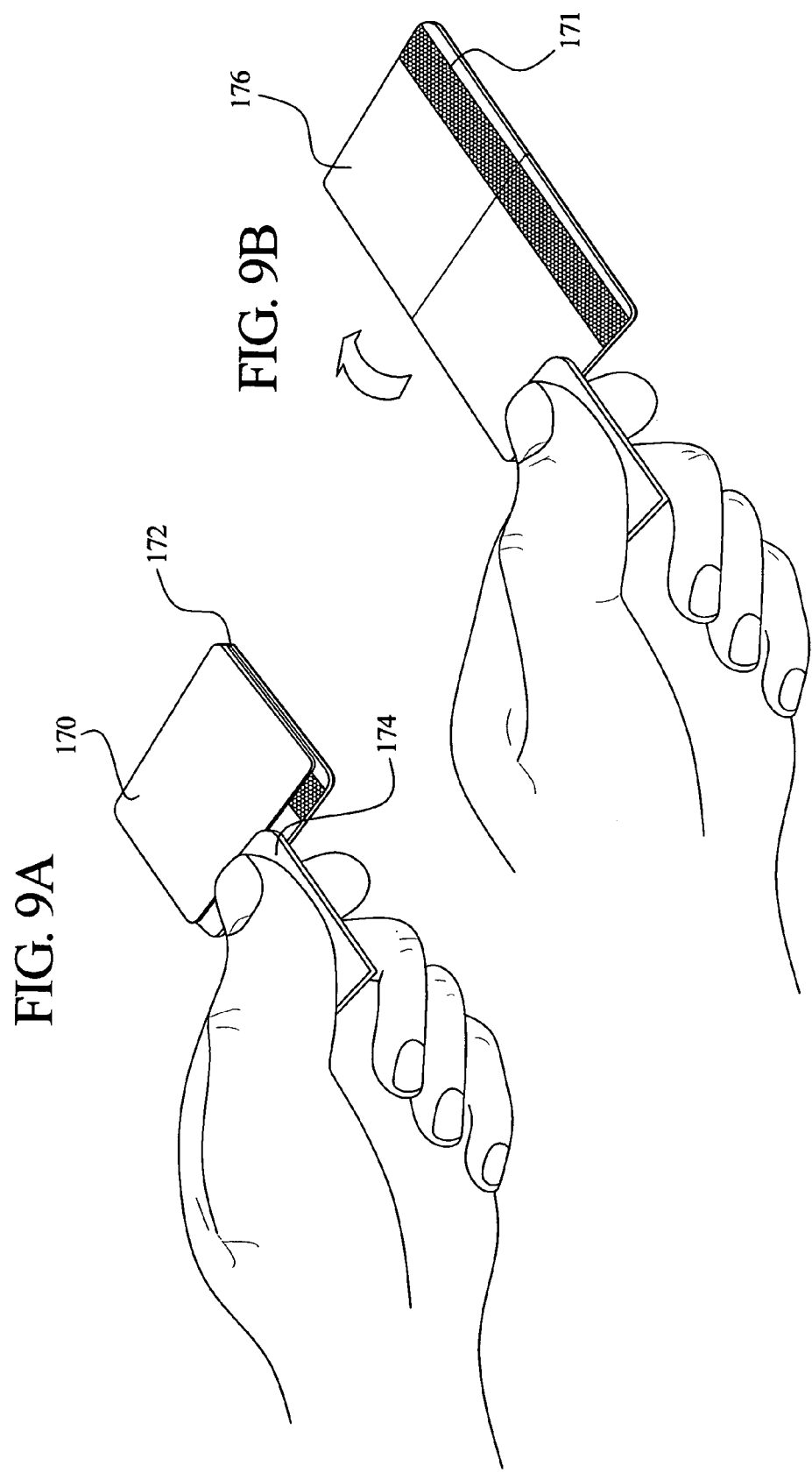

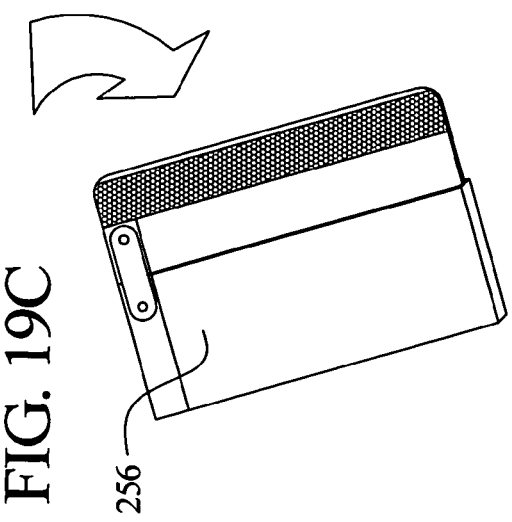
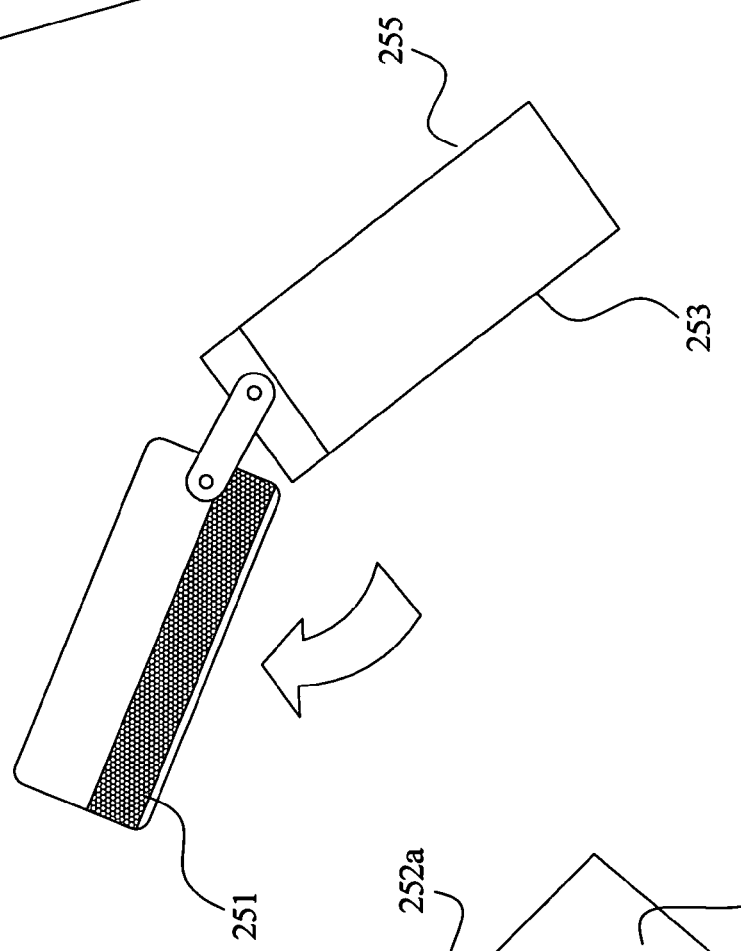
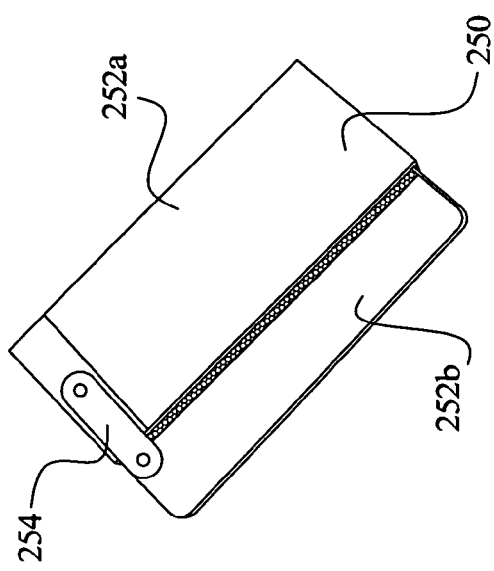
FIG. 19C
FIG. 19B
FIG. 19A

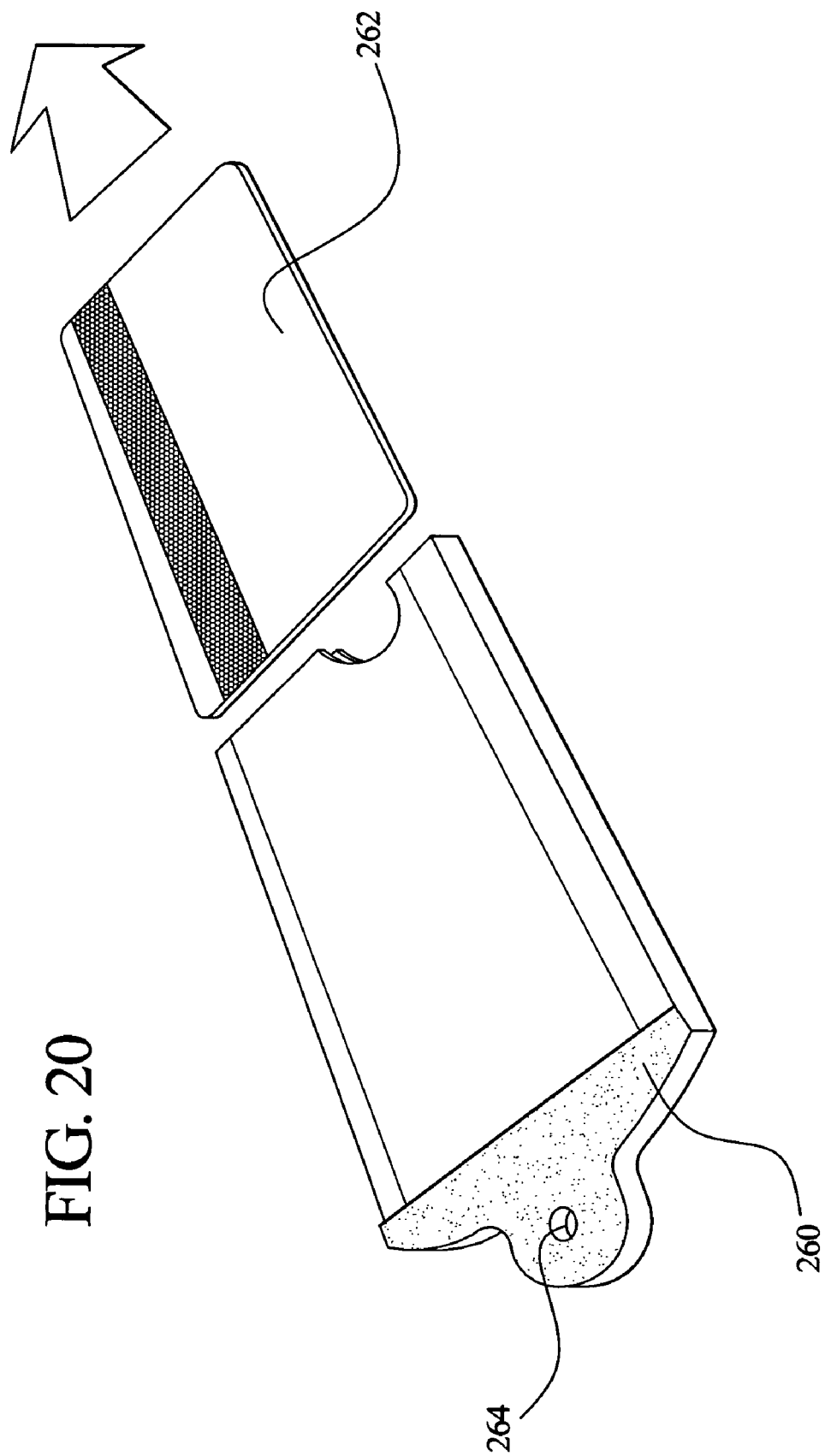

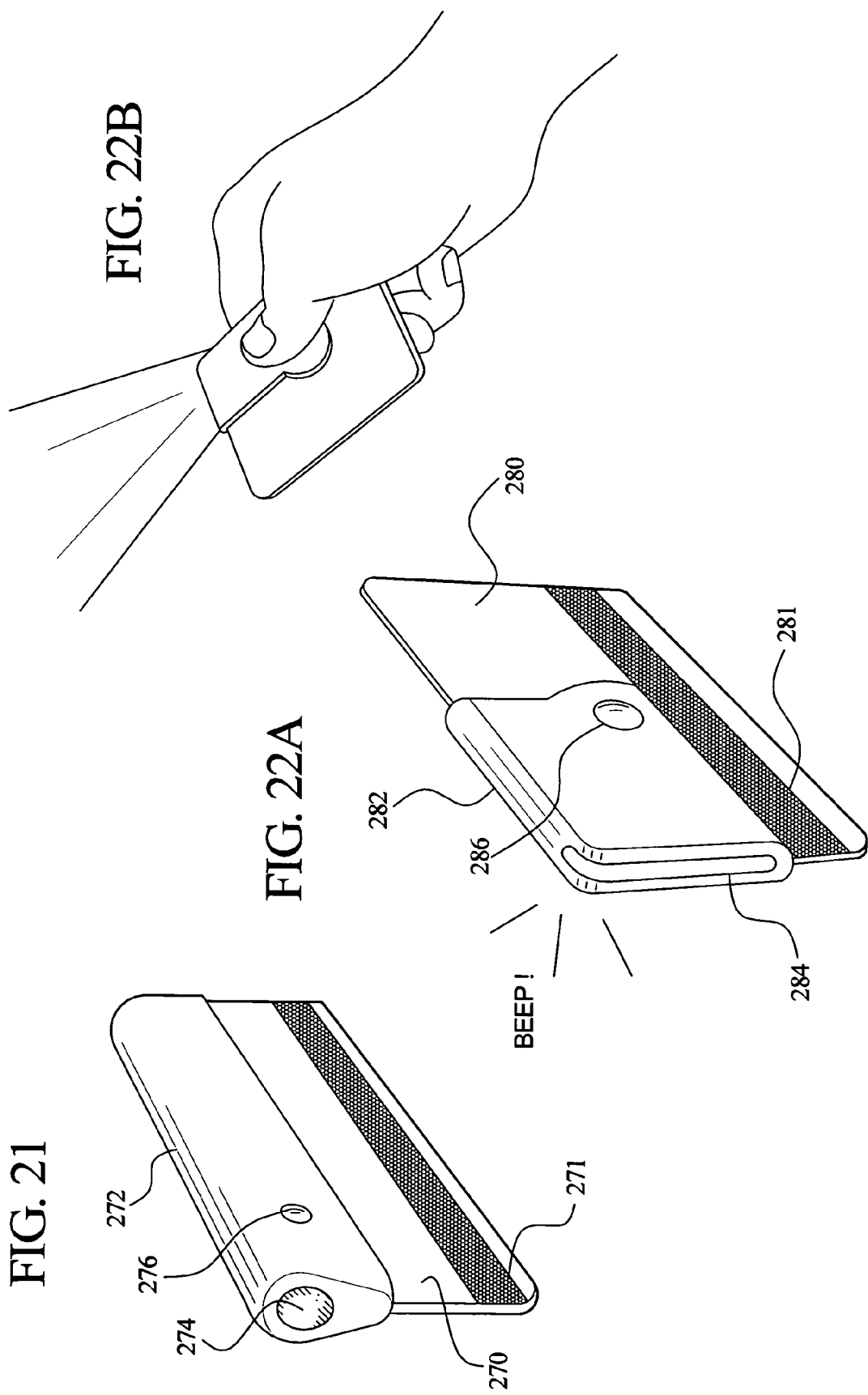

COMPACT OR CONVENIENT TRANSACTION CARDS

FIELD OF THE INVENTION

The present invention relates to protective sleeves for full-sized and smaller-sized transaction cards, cut lines and rotatable elements for forming "fanned" transaction cards, rollable transaction cards, collapsible transaction cards, cards having hinges for rotating parts to form full-sized transaction cards from smaller-sized card sections, protective housings for having lights and sounds emanating therefrom, and other like compact or convenient transaction cards.

BACKGROUND

It is, of course, generally known to provide transaction cards for providing means for purchasing goods or services without the use of paper money or coinage. Specifically, transaction cards may represent credit, whereby a user of the transaction card may present the card in lieu of the paper money or coinage. Alternatively, transaction cards may be debit cards, whereby electronic money, such as money stored in an account, is removed from the account each time that the transaction card is used. In addition, transaction cards may have a certain amount of money, or other valuable commodity, recorded thereon, whereby a user of the transaction card may remove the money directly from the transaction card. For example, retail stores now offer cards that can be purchased for a certain amount of money. That amount, or any other amount, may be represented on the transaction card. When the transaction card is utilized, the amount represented on the card may be reduced until the transaction card represents that it cannot be utilized anymore, or that the card represents that it is not worth any more money. Of course, other value besides currency may be represented on the transaction card, such as equivalent goods or services.

Transaction cards typically have a magnetic stripe provided, or some other means, for storing information relating to the transaction card, such as a security code, and information relating to an account or an amount of money that the transaction card may represent. For example, if the transaction card is a credit card, the information contained on the magnetic stripe may relate to an account whereby use of the credit card may alert the account to release funds for the purchase of goods or services. Of course, the magnetic stripe or other means may further contain any other information to allow the transaction card to be utilized. The transaction card is typically fed into or through a reader that reads the information contained on the magnetic stripe to extract the information as needed when the transaction card is being used.

The transaction card may further contain other features that allow for the secure and efficient use of the transaction card, such as holographic security devices, signature panels, pictures of the owner of the transaction card, embedded microchips, or any other item or element that may be useful for the transaction card.

Transaction cards are typically sized according to standards set by the International Organization for Standardization (ISO). This means that most transaction cards being utilized are of the same size and dimensions, typically about 2.5 inches by about 3 inches in a generally rectangular configuration. However, a transaction card having dimensions according to this standard is relatively large and difficult to store in a convenient way except loose in a pocket, wallet or purse, or contained within a slot in a wallet or purse allowing for the snug fit of the transaction card. Transaction cards are, therefore, highly susceptible to being lost or stolen. Other shapes and sizes would allow the transaction cards to be attached to, secured with, or otherwise stored with other items, such as keychains, for example.

A need exists, therefore, for a transaction card having the capability to be stored with items or in smaller areas than are currently allowed. For example, a need exists for a transaction card that may be clipped or otherwise attached to a keychain, or some other means for securing the transaction card to another item, yet is small enough to remain inconspicuous and compact, but handy. Further, a need exists for a transaction card having the above-noted advantages and further that maintains the information or other features typically disposed on or within a transaction card.

SUMMARY

The present subject matter relates to transaction cards having protective sleeves for full-sized and smaller-sized cards, cut lines and rotatable means for forming "fanned" cards, rollable cards, collapsible cards, cards having hinges for rotating parts to form full-sized cards from smaller-sized cards, housings for having lights and sounds emanating therefrom and other like compact or convenient transaction cards.

The examples described herein satisfy the need of storing transaction cards in smaller areas than currently allowed by providing a transaction card that is foldable or otherwise compactable. Further, the transaction card may be attached to another item via a securing means, such as a ring or chain.

The examples described herein further satisfy the need of storing transaction cards in smaller areas than currently allowed by providing a transaction card that can be attached to a keychain, yet still remain small and compact. Therefore, the transaction card may be small enough to be inconspicuous and be secured to another item thereby minimizing the chance that the transaction card will be misplaced, lost or stolen.

Still further, the examples described herein further satisfy the need of storing transaction cards in smaller areas than currently allowed by providing a transaction card that is foldable that comprises other features typically found on or within a transaction card, such as security devices, embedded microchips, or magnetic stripes having information stored thereon or the like.

Additional features and advantages of the embodiments described herein are described in, and will be apparent from, the detailed description of the presently preferred embodiments and from the drawings.

BRIEF DESCRIPTION OF THE DRAWINGS

FIGS. 9A–9B illustrate an example of a foldable transaction card having a clip for holding the transaction card in a folded position.

FIGS. 19A–19C illustrate a still further example of a transaction card having separable sections connected by a rotatable arm.

FIG. 20 illustrates an alternate example of a transaction card contained within a housing that is slidably removable from the housing.

FIG. 21 illustrates an example of a transaction card having a housing disposed thereon with a light and/or sound emitting device.

FIGS. 22A–22B illustrate an alternate example of a transaction card having a housing disposed thereon and a light within the housing.

DETAILED DESCRIPTION

The present subject matter relates to transaction cards having one or more folds therein to provide compact and easily stored transaction cards. Moreover, some examples of the present invention relate to a foldable transaction card having one or more holes or apertures therein for holding a keychain, or other device for attaching the transaction card to another item, such as a set of keys, a wallet, or other item. Other examples include spring-loaded clips on folded transaction cards, protective sleeves for full-sized and smaller-sized cards, cut or score lines and rotatable elements for forming "fanned" cards, rollable cards, collapsible cards, cards having hinges for rotating parts to form full-sized cards from smaller-sized card sections, housings for providing lights and/or sounds emanating therefrom and other like compact or convenient transaction cards.

Figure 1A:
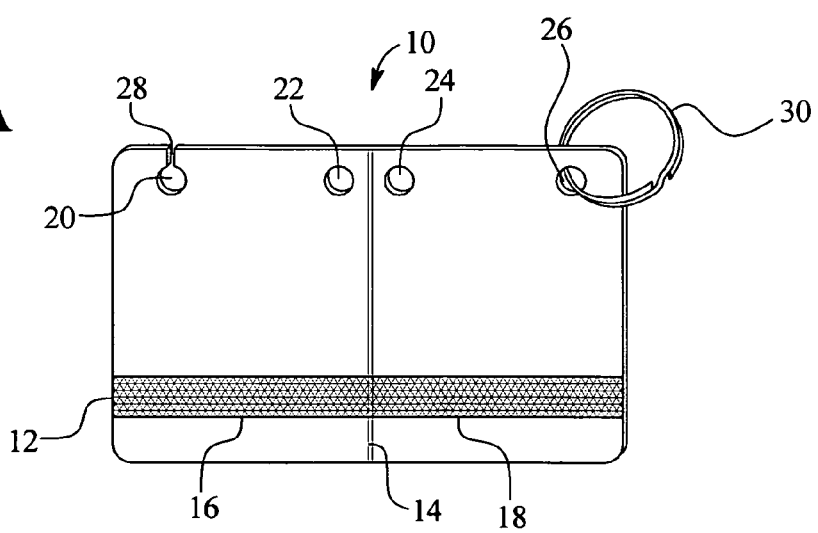
FIGS. 1A–1C illustrate a transaction card that is transversely foldable and having apertures for securing a ring or a chain thereto.
Figure 1B:
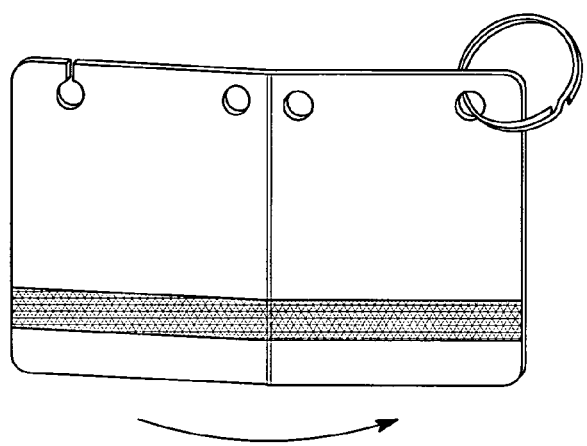
Figure 1C:
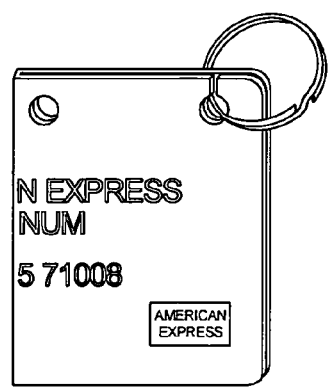

Referring now to FIGS. 1A–1C, a first example is illustrated. FIGS. 1A–1C illustrates a foldable transaction card 10, shown generically as merely having a magnetic stripe 12. Other features not shown, however, may be provided on the transaction card, such as, for example, a signature panel, an embedded microchip, a holographic image, or the like. These features may allow the transaction card to function more easily, efficiently, and/or more securely.

As is known to one of ordinary skill in the art, the transaction card 10 typically comprises a plurality of layers (not shown) to form the rigid card. For example, transaction cards typically include inner layers of a polymeric material to provide the transaction card with thickness and bulk. In addition, outer layers are typically provided comprising a polymeric material that protects the inner layers of the transaction card. In addition, the polymeric material of the outer layers may provide rigidity and further may add to the thickness of the transaction card. The transaction card 10, and the other transaction cards described herein, may be made from any generally known material typically used for transaction cards, such as, for example, polyvinylchloride (PVC) and polypropylene (PP). Typically, transaction cards such as the ones described herein have multiple layers of polymeric materials. For example, a typical card may have one or more internal layers of PVC or PP, and outer layers of polyethylene terephthalate (PET) for rigidity and strength.

Transaction cards may further be transparent, as described in U.S. patent application Ser. No. 10/092,681, filed Mar. 7, 2002, which is a continuation-in-part application of U.S. patent application Ser. No. 10/062,106, filed Jan. 31, 2001, which is a continuation-in-part application of U.S. patent application Ser. No. 09/653,837, filed Sep. 1, 2000 and further claims the benefit of U.S. Provisional Application No. 60/153,112, filed Sep. 7, 1999; U.S. Provisional Application No. 60/160,519, filed Oct. 20, 1999; U.S. Provisional Application No. 60/167,405, filed Nov. 24, 1999; U.S. Provisional Patent Application No. 60/171,689, filed Dec. 21, 1999, each of which is expressly incorporated herein in its entirety. The transparent transaction card may contain a plurality of optically recognizable layers or an infrared-blocking ink to allow the transparent transaction cards to be recognized by a card reader.

The transaction card 10 has a fold line 14 that allows the transaction card 10 to be folded, as illustrated in FIGS. 1B and 1C. The fold line may be made by scoring the outer layers of the transaction card 10 via a scoring means, such as a blade or a focused energy beam, such as a laser beam. This may allow the inner layers to act as a hinge when the transaction card is folded. Alternatively, the transaction card may include a reinforcing material at the location of the fold line 14 so that the fold line 14 does not pull apart, or otherwise destroy the transaction card 10 when folded. Of course, other materials may be utilized in the transaction card 10 to act as a hinge at the fold line 14, and the invention should not be limited as herein described.

The magnetic stripe 12 may contain a material for storing information that may be read by a magnetic stripe reader. Typically, the magnetic stripe 12 contains a series of digits that the magnetic card reader can utilize to obtain information about the account that the transaction card is associated with, or otherwise to obtain information relating to the amount of money or other equivalent good or service represented by the transaction card 10. The magnetic stripe 12 of the present embodiment is split into two halves because of the fold line 14 that bisects the magnetic stripe 12. Therefore, the information contained on the magnetic stripe 12 must be readable by a magnetic card reader, accounting for the fold line 14. Typically, this means that some or all of the information may be contained on a first section 16 of the magnetic stripe 12, and the rest or a duplicate of the information may be contained on a second section 18 of the magnetic stripe 12. Therefore, the information contained on the magnetic stripe 12 may be readable by the magnetic stripe reader. Alternatively, the magnetic stripe may be provided in parallel with one of the short ends of the transaction card, as illustrated in FIGS. 2A–2C, below.

Provided in the transaction card 10 may be a plurality of apertures 20, 22, 24 and 26 that may be utilized to attach the transaction card 10 to a securing means, such as a ring 28, as illustrated in FIGS. 1A–1C. Of course, any other securing means, such as a chain or string, for example, may be utilized and the present invention should not be limited as herein described. The securing means can be provided in any of the apertures as needed. Aperture 20 may include a channel 28 that allows a securing means to be slipped into the aperture 20. For example, as illustrated in FIG. 1C, the ring 28 may be provided within the aperture 26, but may also fit within the aperture 20 through the channel 28 so that the transaction card may stay folded. Alternatively, the ring 28 may be provided through one or both of the apertures 22, 24. If the ring 28 is provided through both of the apertures 22 and 24, the ring 28 may be configured in such a way as to allow the transaction card 10 to be unfolded when used.

Figure 2A:
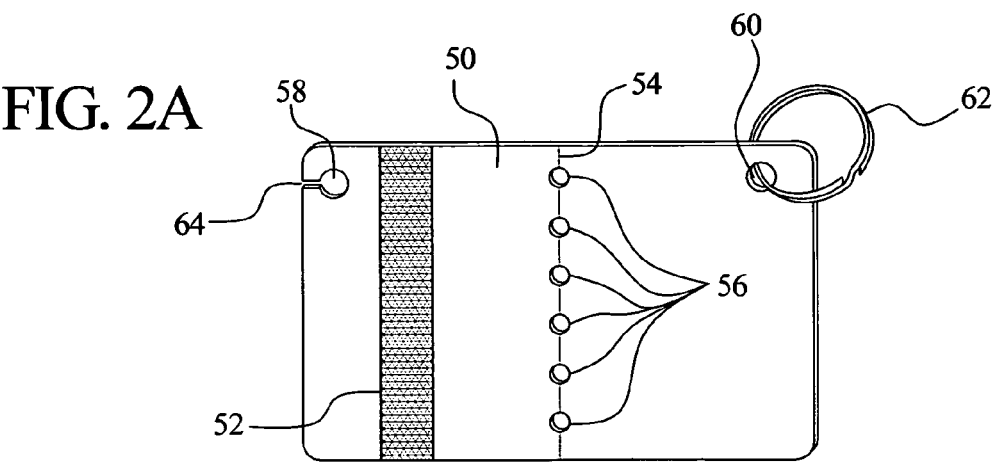
FIGS. 2A–2C illustrate another example of a transaction card.
Figure 2B:
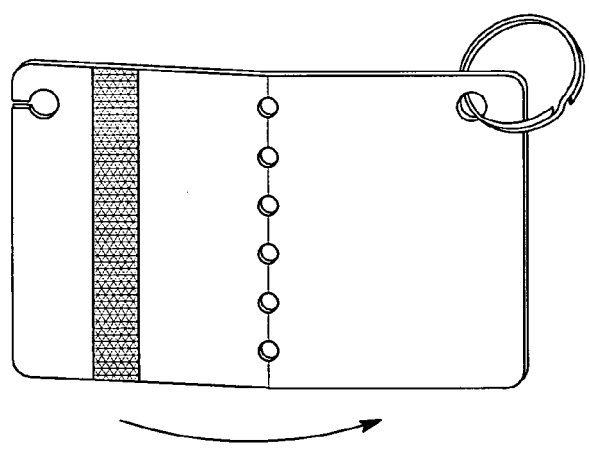
Figure 2C:
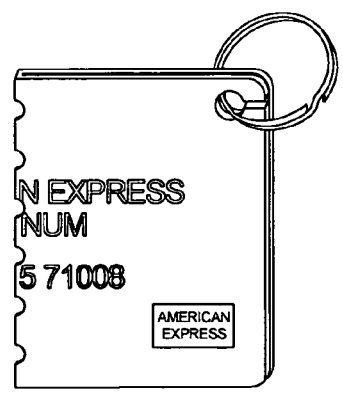

FIGS. 2A–2C illustrate another example of a foldable transaction card 50 having a magnetic stripe 52 that is parallel to a short side of the transaction card 50. The transaction card 50 may be very similar to the transaction card 10, as described above and may have a fold line 54 that divides the transaction card into two halves. Of course, more than one fold line may be provided in the transaction card 50 for dividing the card into more than just two halves, as herein described. The transaction card may further have a plurality of holes 56 provided along the fold line 54 thereby giving the transaction card 50 a distinctive appearance, and further aiding in allowing the transaction card 50 to be folded along the fold line 54.

The transaction card 50 may further have apertures 58, 60 for a securing means, such as a ring 62, or other securing means such as a chain or a string, for example. The ring 62 may be provided through the aperture 60, and may further be clipped into the aperture 58 after the transaction card 50 has been folded, as illustrated in FIG. 2C. To allow the ring 62 to be clipped into the aperture 58, the aperture 58 may include a channel 64.

Figure 3A:
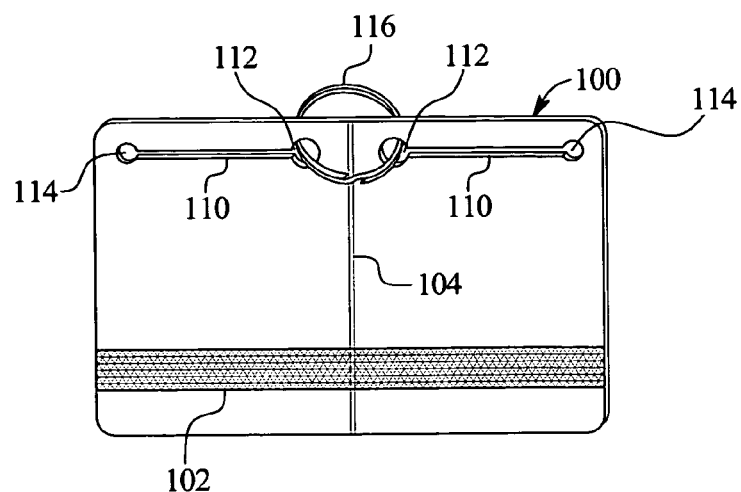
FIGS. 3A–3D illustrate another example of a transaction card.
Figure 3B:
Figure 3C:
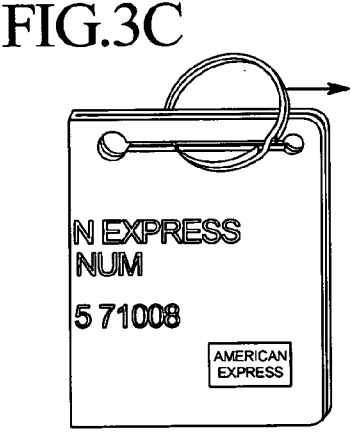
Figure 3D:

FIGS. 3A–3D illustrate another example of a transaction card 100 having similar features to the transaction card 10 of FIGS. 1A–1C. For example, the transaction card 100 includes a magnetic stripe 102 and a fold line 104 allowing the transaction card 100 to be folded, thereby making the transaction card smaller and more compact. Each half of the transaction card 100 may include a slit 110 connecting two apertures 112 and 114. A ring 116, or other securing means, may be provided through the apertures 112 such that, when folded, as illustrated in FIGS. 3B–3D, the ring 116 may translate through the slit 110 to rest in the aperture 114, thereby keeping the two halves of the transaction card 100 together when folded. If the transaction card 100 is to be opened, the ring 116 is merely translated back to the apertures 112 and the transaction card 100 is unfolded.

Figure 4A:
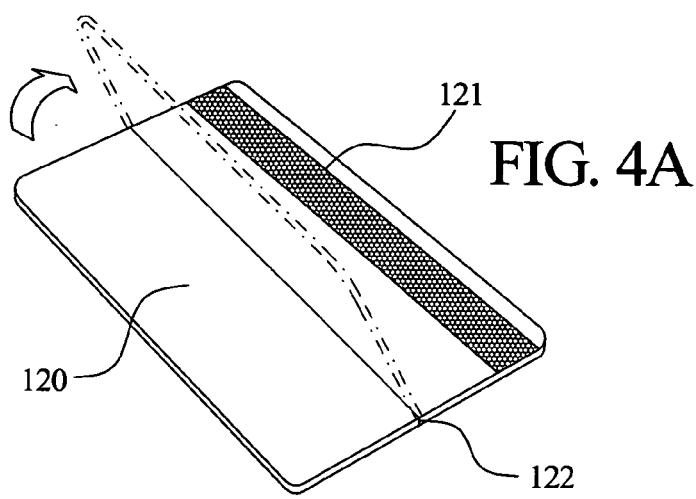
FIGS. 4A–4B illustrate a foldable transaction card that is foldable along a longitudinally-disposed fold line.
Figure 4B:
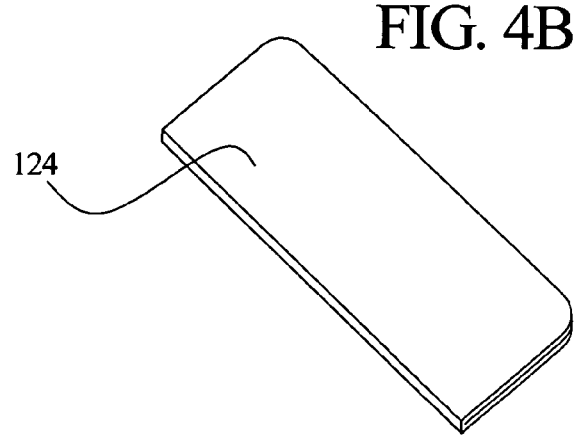

FIGS. 4A–4B illustrate another example of a transaction card 120 having a magnetic stripe 121 and a fold line 122 disposed longitudinally through the center of the transaction card 120 such that when the transaction card 120 is folded along said fold line 122, a folded transaction card 124 is created, as shown in FIG. 4B, which thereby protects the magnetic stripe 121. It should be noted that a smaller-sized transaction card may be created even if the fold line is not disposed longitudinally through the center of the transaction card 120.

Figure 5A:
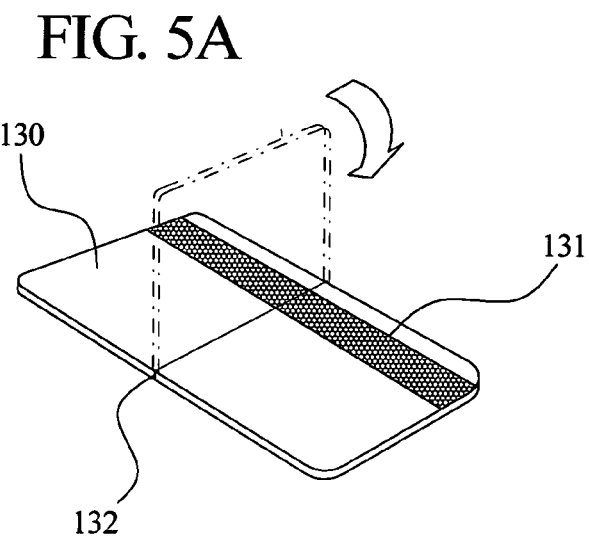
FIGS. 5A–5B illustrate a foldable transaction card that is foldable along a transversely-disposed fold line.
Figure 5B:
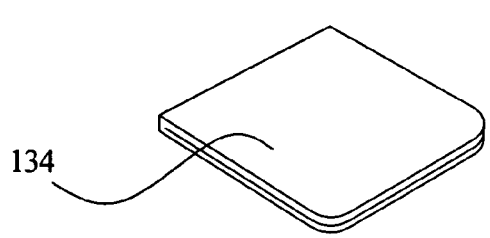

FIGS. 5A–5B illustrate another example of a miniature transaction card 130 having a magnetic stripe 131 and a fold line 132 disposed transversely through the center of the card 130 such that when the miniature transaction card 130 is folded along said fold line 132, a folded miniature transaction card 134 is created, as illustrated in FIG. 5B. The size of the miniature transaction card 130 may be smaller than a normally-sized transaction card. It should be noted that a smaller-sized transaction card may be created even if the fold line is not disposed transversely through the center of the transaction card 130.

Figure 6A:
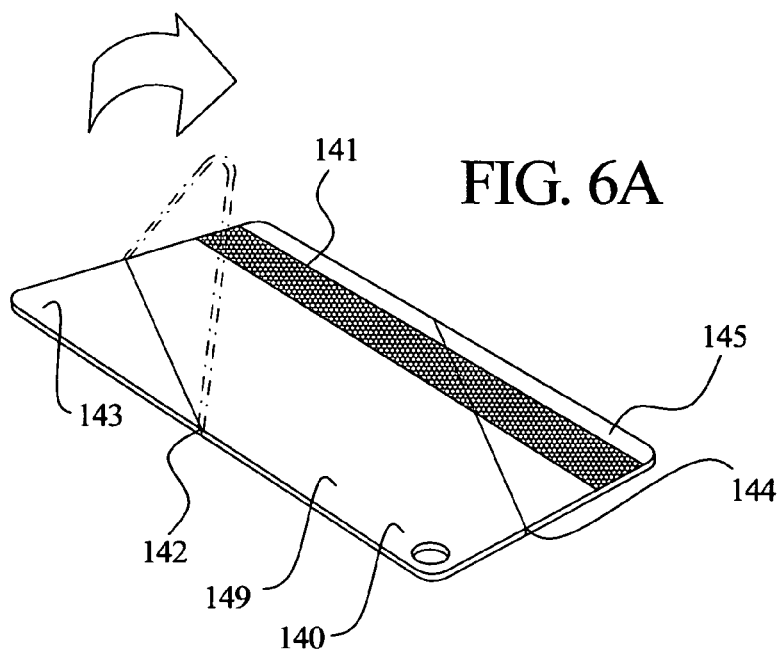
FIGS. 6A–6C illustrate a foldable transaction card and a method of using the same comprising at least two fold lines disposed parallel to each other and further disposed diagonal relative to the side of said transaction cards that is usable in a card reader.
Figure 6B:
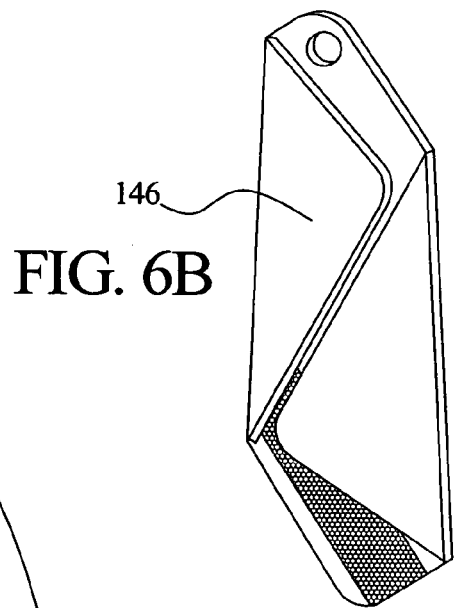
Figure 6C:
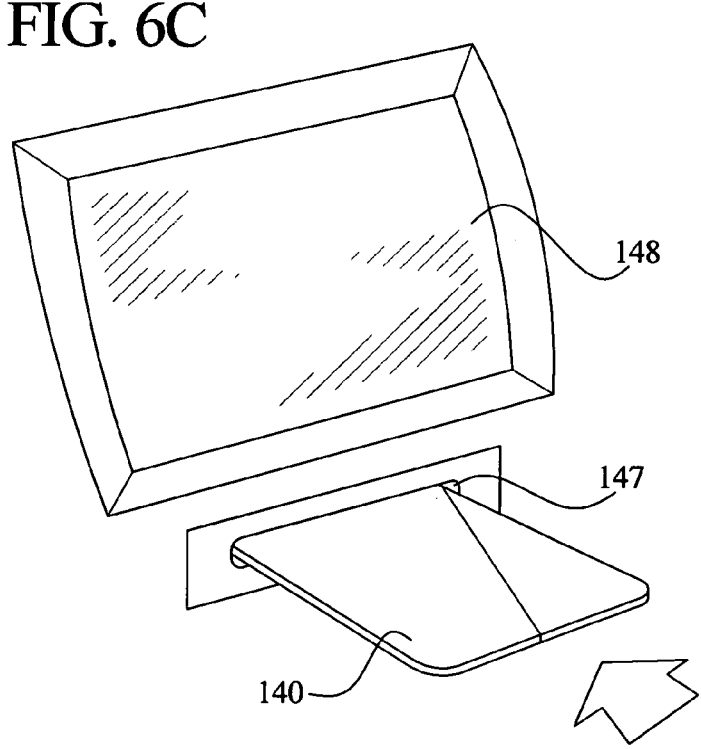

FIGS. 6A–6C illustrate another example of a foldable transaction card 140 having a magnetic stripe 141 and two fold lines 142, 144 disposed parallel to each other but diagonal relative to the edges of the transaction card 140. The fold lines 142, 144 allow the transaction card 140 to be folded such that flaps 143, 145 fold over section 149 to form a folded transaction card 146, as illustrated in FIG. 6B, which substantially protects the magnetic stripe 141. When unfolded, the transaction card 140 may be inserted into a slot 147 of an automatic teller machine (ATM) without difficulty, as illustrated in FIG. 6C.

Figure 7A:
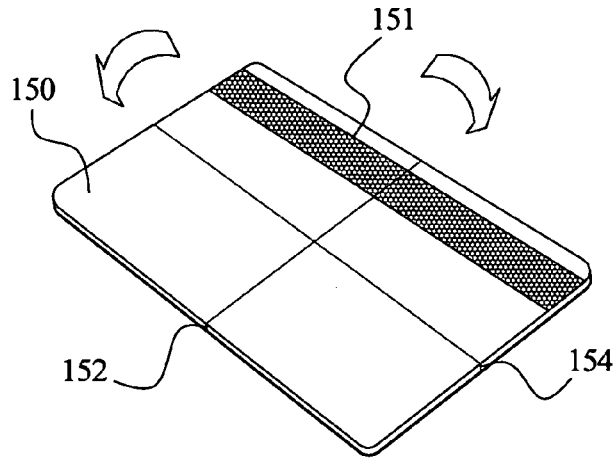
FIGS. 7A–7B illustrate a foldable transaction card comprising at least two fold lines disposed perpendicular to each other and to respective sides of said transaction card.
Figure 7B:
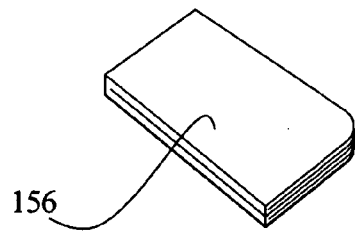

FIGS. 7A–7B illustrate another example of a foldable transaction card 150 having a magnetic stripe 151 and two fold lines 152, 154 that are disposed both longitudinally and transversely across the transaction card 150, thereby being disposed perpendicular to each other. The fold lines 152, 154 allow the transaction card 150 to be folded twice to form a folded transaction card 156 that protects the magnetic stripe 151, as illustrated in FIG. 7B.

Figure 8A:
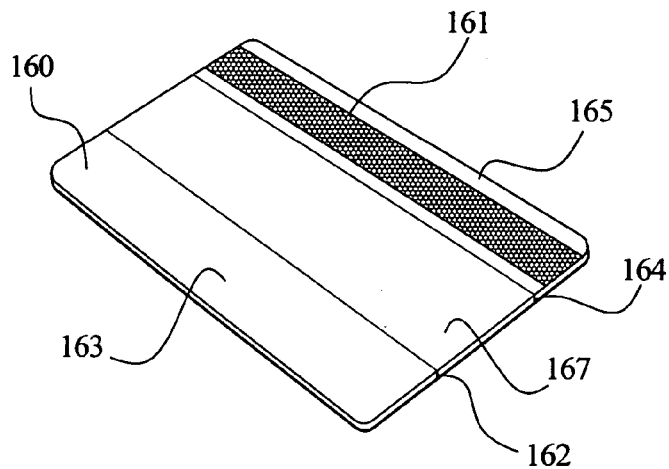
FIGS. 8A–8B illustrate a still further example of a transaction card having at least two fold lines therein longitudinally disposed in said transaction card for folding said transaction card into three or more sections.
Figure 8B:
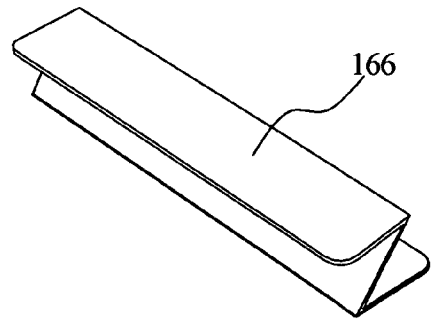

FIGS. 8A–8B illustrate another example of a foldable transaction card 160 having a magnetic stripe 161 and two fold lines 162, 164 that are disposed longitudinally, but subdivide the transaction card 160 into three sections: two outer sections 163, 165 and a central section 167. The fold lines 162, 164 allow the transaction card 160 to be folded twice to form a folded transaction card 166 that protects the magnetic stripe. The folded transaction card 166 may be folded as shown in FIG. 8B, which shows the transaction card 160 such that the outer sections 163, 165 of the transaction card 160 are folded inwardly on opposite sides of the central section 167. Alternatively, the transaction card 160 may be folded such that the outer sections 163, 165 of the transaction card 160 are folded inwardly on the same side of the central section 167.

FIGS. 9A–9B illustrate another example of a folded transaction card 170 having a fold line 172 and a spring-loaded clip 174 that may maintain the folded transaction card 170 in a folded state. By releasing the spring-loaded clip 174, the folded transaction card 170 may unfold along fold line 172 to form an unfolded transaction card 176 having a visible magnetic stripe 171, as illustrated in FIG. 9B.

In another example, a transaction card, similar to the cards described above with respect to FIGS. 1A–9B, may have a fold line disposed between at least first and second sections. Further, the transaction card may have a snap, button or other mechanism (collectively a "snap") which may hold the folded transaction card in a first engaged or locked position. The transaction card may not be usably accessible when the snap is in the engaged position. When the snap is actuated, the snap disengages or unlocks and the second section of the convenience card unfolds into an "unfolded position". The fold line may be disposed either longitudinally or transversely across the face of the transaction card.

In the unfolded position, the transaction card becomes a full-sized transaction card and/or a card that may be used as a form of payment to conduct transactions and in standard financial transaction card readers, such as those at retail point-of-sale locations or ATM (cash) machines. In a preferred embodiment, when the second section is folded and is otherwise inaccessible, the external surface area of the card is approximately half of that when the second section is usably accessible in the unfolded position. In an alternate embodiment, the transaction card can be refolded by folding the first and second sections in relation to one another and re-engaging the snap to keep the card folded. To allow folding, the first and second sections may be coupled by a flexible material or hinge. In an alternative embodiment, the card may have a plurality of folding sections.

In another example, the transaction card has an associated holder, receptacle, pocket, or sleeve (collectively, the "carrier") that can fold in relation to the transaction card and in which the transaction card can be enclosed in whole or in part. The carrier itself may have a snap in an engaged or locked position such that in a first position, a second section of the carrier is folded in relation to a first section of the carrier (the "folded position of the carrier"), such that the transaction card is not usably accessible. When the carrier snap is actuated, the snap disengages or unlocks and the carrier second section unfolds in relation to the carrier first section, making accessible a foldable transaction card that simultaneously unfolds in relation to the carrier. The transaction card may be coupled to the carrier in a manner that allows it to be attached or detached. The carrier, in order to fold, may also have at least first and second sections coupled by a flexible material or hinge.

Figure 10:
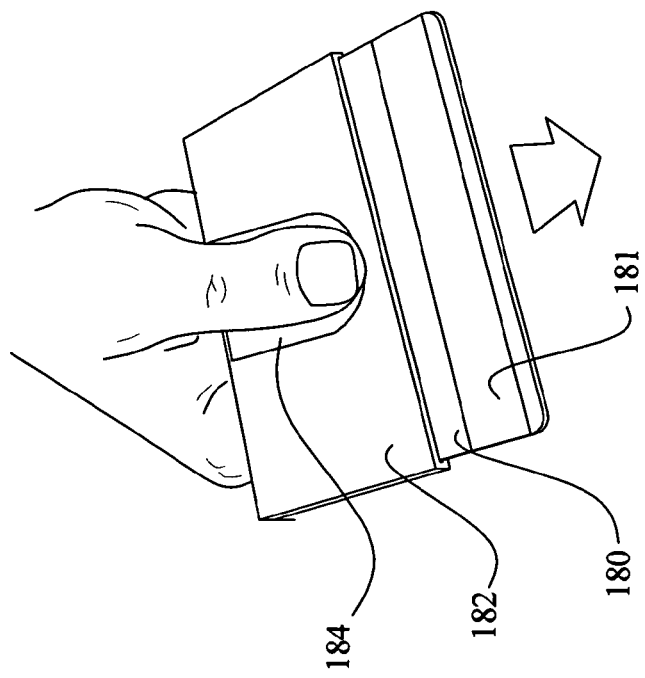
FIG. 10 illustrates a further example of a transaction card contained within and slidable within a housing.

FIG. 10 illustrates another example of a full-sized transaction card 180 disposed within a sleeve 182 having an aperture 184 that allows an individual's thumb, or other digit, to push on the transaction card 180 to slidably move the transaction card 180 from the sleeve 182, thereby exposing a magnetic stripe 181 to be read by a magnetic stripe reader. The transaction card 180 may be partially or completely removed from the sleeve 182.

Figure 11:
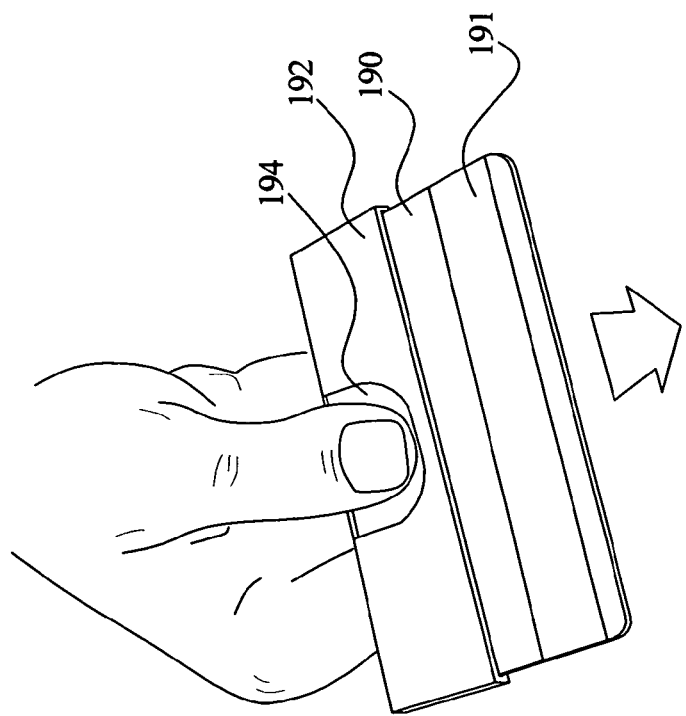
FIG. 11 illustrates a transaction card contained within and slidable from a housing.

FIG. 11 illustrates another example of a transaction card 190 that is smaller in width than a normal transaction card and is disposed within a sleeve 192 having an aperture 194 for pushing the transaction card 190 from the sleeve 192, thereby exposing a magnetic stripe 191. When pushed fully from the sleeve 192, the transaction card 190 and sleeve 192 may be as large as a normal-sized transaction card (i.e., a transaction card of the dimensions according to the standard), thereby allowing the magnetic stripe 191 to be fed into and read by automatic teller machines.

Figure 12B:
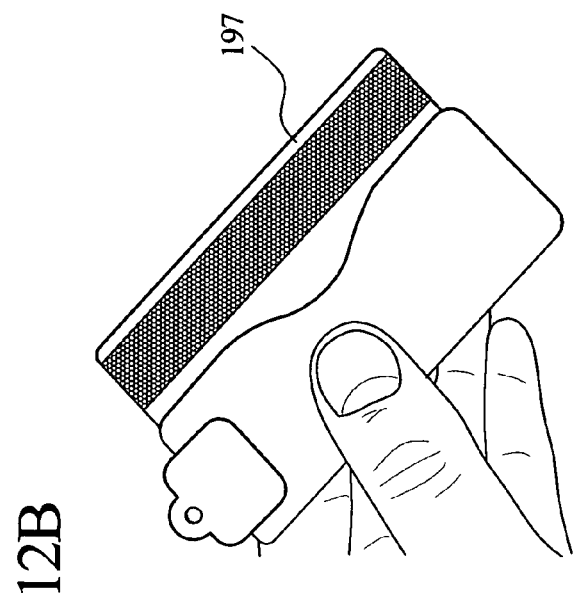
FIGS. 12A and 12B illustrate an alternate example of a transaction card contained within and slidable from a housing.
Figure 12A:
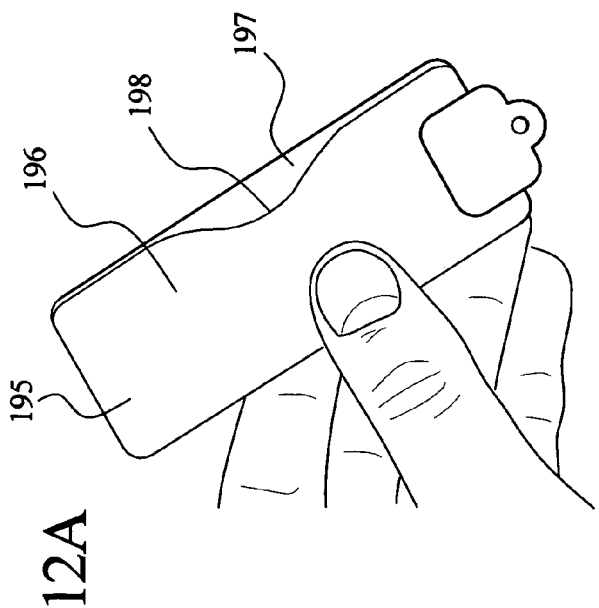

FIGS. 12A and 12B illustrate another example of a transaction card system 195 having a housing 196 having a portion of a transaction card 197 contained therein. The transaction card 197 may be slidable from the housing 196 because of an area 198 in the housing that provides a gripping area for the transaction card 197 to grip the transaction card and slide the transaction card 197 from the housing 196, as illustrated in FIG. 12B. Once slid from the housing 196, the transaction card system 195 has roughly the same dimensions as a full-sized transaction card. Therefore, the transaction card system can be utilized as a full-sized transaction card in point-of-sale transaction card reading machines, such as automatic teller machines (ATMs).

Alternatively, the transaction card of FIGS. 10 and 11 may have a first section and a second section. Further, the transaction card may have a snap, button or other mechanism (collectively a "snap") in an engaged or locked position on the transaction card. The snap may be engaged to the sleeve, which may be a holder, receptacle, pocket, or other means for holding the transaction card, as described above with reference to FIGS. 10 and 11. When the snap on the transaction card is in an engaged position, a second section of the transaction card is not usably accessible from within the sleeve or carrier. When the snap is actuated, the snap disengages or unlocks to a disengaged position such that the second section of the transaction card that was not usably accessible when the snap was in the engaged position is made usably accessible from the carrier whereby the transaction card moves or otherwise can then be pushed or partially removed from the sleeve or carrier into a second position, as described above, thereby exposing the second section.

When the transaction card is partially removed from the sleeve or carrier and the transaction card is moved into a second position, the transaction card and sleeve or carrier constitute a full-sized financial transaction card. The full-sized transaction card may be used as a form of payment to conduct transactions, and may be utilized in standard financial transaction card readers such as those at retail point-of-sale locations or ATM (cash) machines.

In one embodiment, when the second section of the transaction card is not usably accessible in the first position, the external surface area of the card is approximately half of that when the second section is usably accessible when the transaction card is in the second position. At the user's discretion, the second section can be re-positioned in the sleeve or carrier in the first position such that it is no longer usably accessible and the snap re-engaged to keep the section in place. The transaction card may also be coupled to the sleeve or carrier in a manner that allows it to be attached or detached from the carrier. The first and/or second sections may be contained, in whole or in part, within the carrier in the first or second positions.

Figure 13B:
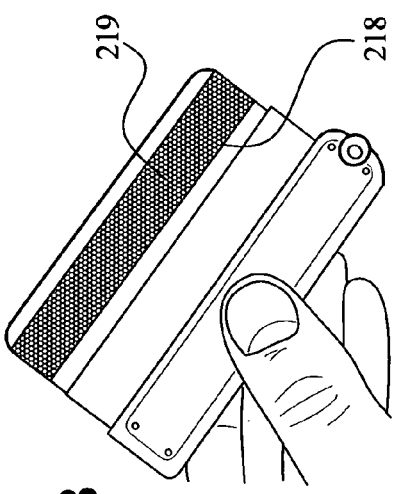
FIGS. 13A and 13B illustrate an alternate example of a transaction card contained within and slidable from a housing, wherein the card is ejected from the housing via a clip, snap or button.
Figure 13A:
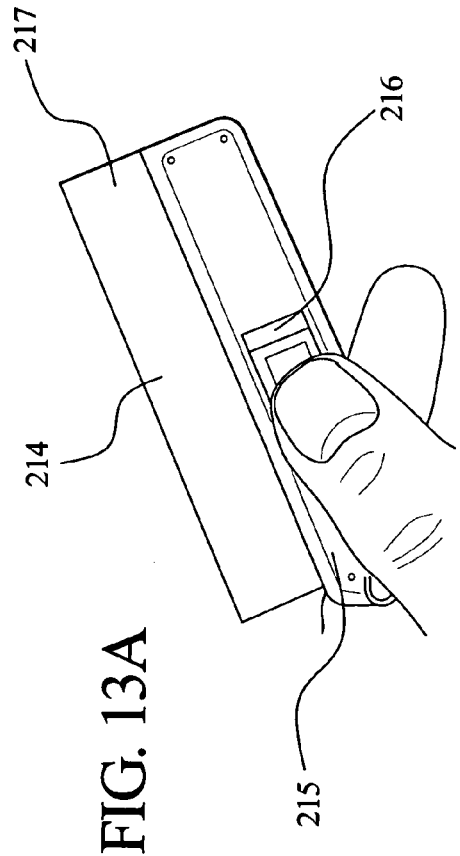

In an example of the description above, FIGS. 13A and 13B illustrate a transaction card system 214 wherein a housing 217 is provided on a holder 215 having a switch, clip, button, or other mechanism (collectively, a "snap") 216. Disposed within the housing 217 is a portion of a transaction card 218, as illustrated in FIG. 13B. When the snap 216 is actuated, the portion of the transaction card 218 is ejected from the housing 217 so that a magnetic stripe 219 is exposed. However, the portion of the transaction card 218 is not fully removable from the housing 217. The housing 217 may be removable from the holder 215 to provide a transaction card system having dimensions roughly similar to a full-sized transaction card, such that the portion of the transaction card 218 and the housing 217 can be utilized in any point-of-sale card reading machine, such as an ATM.

Figure 14:
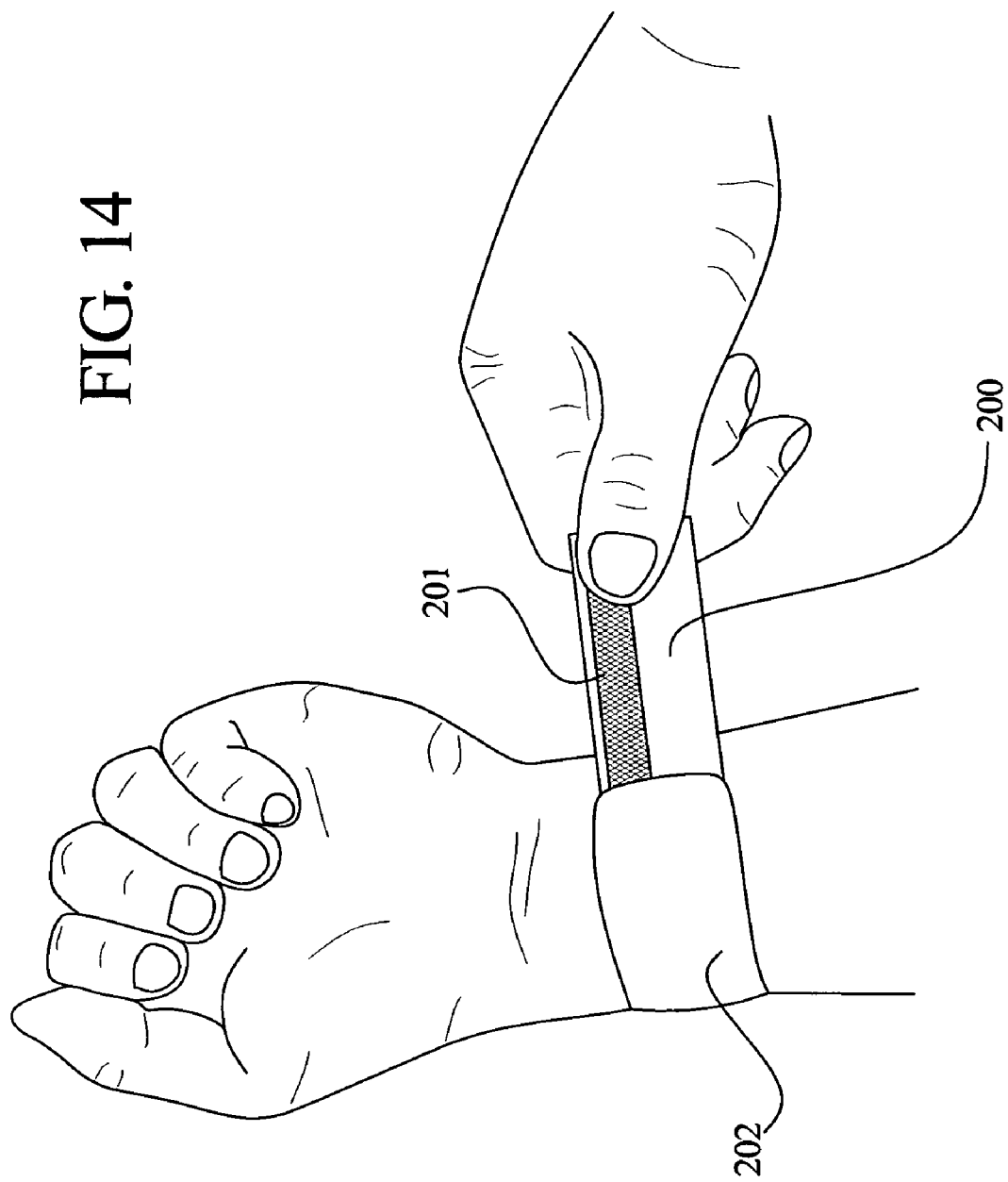
FIG. 14 illustrates an alternate example of a transaction card contained within a housing disposed on the wrist of a user of the transaction card.

FIG. 14 illustrates another example of a transaction card 200 having a magnetic stripe 201 wherein the transaction card 200 may be disposed within a sleeve 202 that may be carried on a person's wrist or the like. The transaction card 200 may be flexible, so as to curve with the sleeve 202 when wrapped around a person's wrist. In addition, the transaction card 200 may be slidable within the sleeve 202 so as to be pushed completely within the sleeve 202 or pulled out of the sleeve 202, thereby exposing the magnetic stripe 201. Alternatively, the transaction card may be foldable so as to fit within the sleeve 202.

Figure 15B:
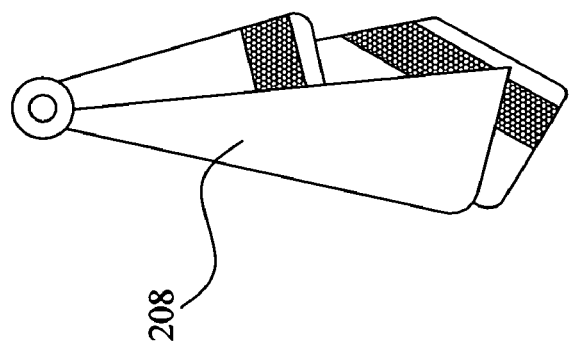
FIGS. 15A–15B illustrate a still further example of a transaction card having separable sections connected on an axle.
Figure 15A:
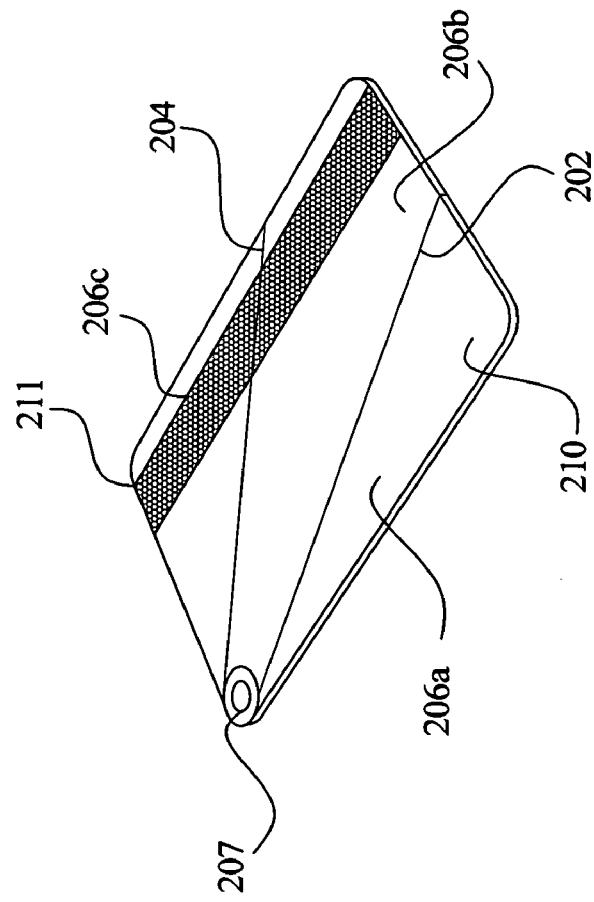

FIGS. 15A–15B illustrate another example of a transaction card 210 having a magnetic stripe 211 and cut lines 202, 204 disposed from a corner of the transaction card 200 to opposite sides of the transaction card 200, thereby forming three separate pieces 206a, 206b and 206c of the transaction card 200. Each of the pieces 206a, 206b, 206c may be connected at the corner of the transaction card on an axis via a button, disk, axle or other rotatable means 207. The pieces 206a and 206c may be rotatable toward piece 206b to formed a closed transaction card 208 that may substantially protect the magnetic strip 211, as illustrated in FIG. 15B. In addition, the closed transaction card 208 may be opened by rotating the pieces 206a and 206c away from the piece 206b.

Figure 16B:
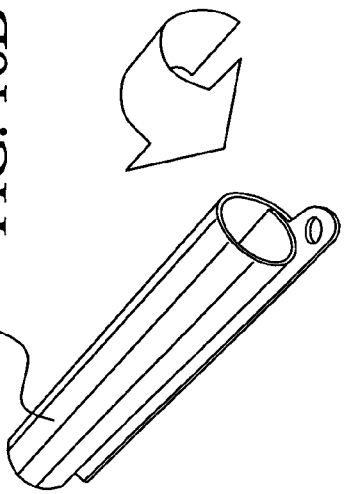
FIGS. 16A–16B illustrate an alternate example of a transaction card having a plurality of scores within the transaction card for rolling the transaction card.
Figure 16A:
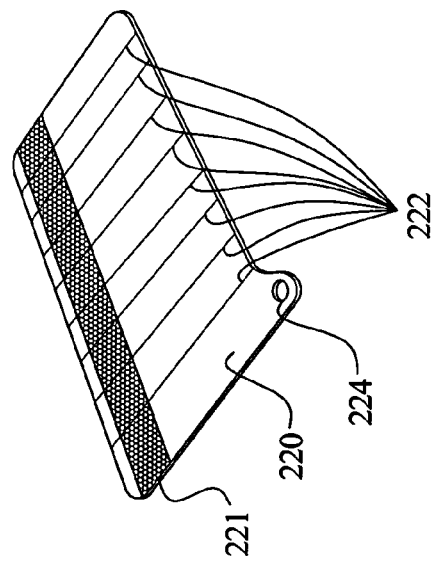

FIGS. 16A–16B illustrate another example of a transaction card 220 having a magnetic stripe 221, an aperture 224 for clipping the transaction card to a keychain or the like, and a plurality of fold or score lines 222 transversely disposed along the transaction card 220. The magnetic stripe 221 may be free of the fold lines 222 to maintain a complete and uninterrupted magnetic stripe for readability purposes of the magnetic stripe when swiped. The transaction card 220 may be rolled by slightly folding each of the fold lines 222 to form a rolled transaction card 226, as illustrated in FIG. 16B.

Figure 17A:
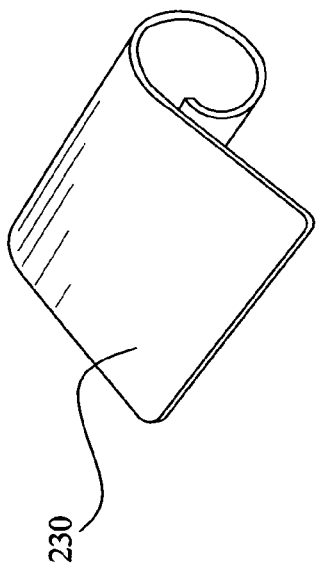
FIGS. 17A–17B illustrate a further alternate example of a transaction card that is rollable without cut lines disposed therein.
Figure 17B:
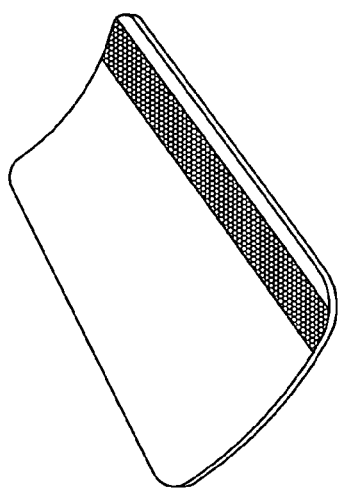

FIGS. 17A–17B illustrate another example of a transaction card 230 that may have no score lines or fold lines, as described above with respect to FIGS. 16A–16B, but may be sufficiently flexible so as to be rollable. For example, the transaction card 230 may be sufficiently thin so as to be rollable, such that the transaction card may go from a rolled state, as illustrated in FIG. 15A, to an unrolled state, as illustrated in FIG. 17B.

Figure 18A:
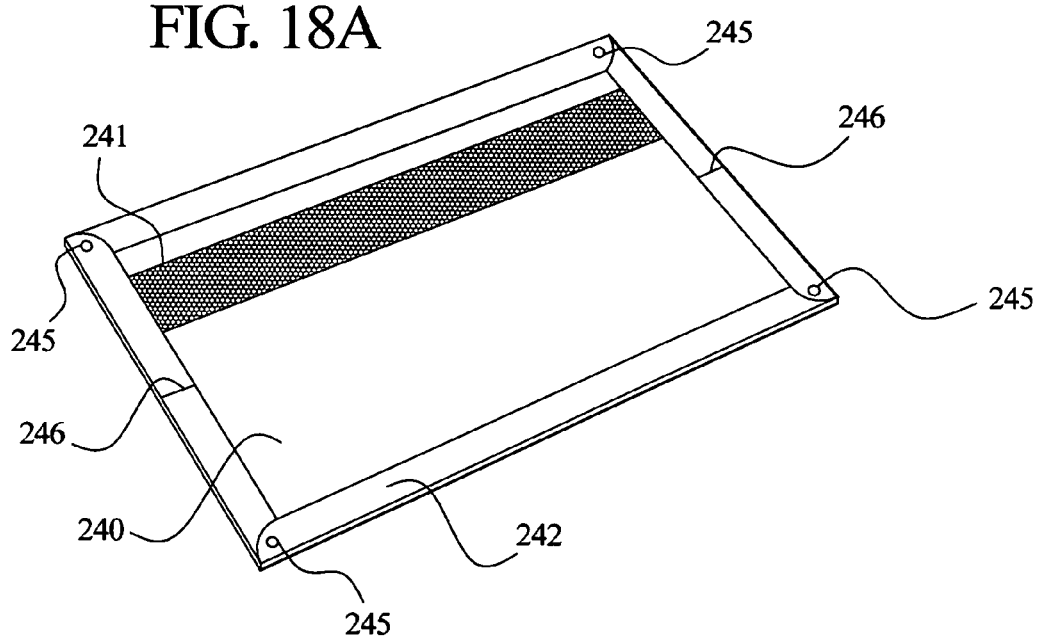
FIGS. 18A–18B illustrate another example of a transaction card having a collapsible frame for collapsing the transaction card.
Figure 18B:
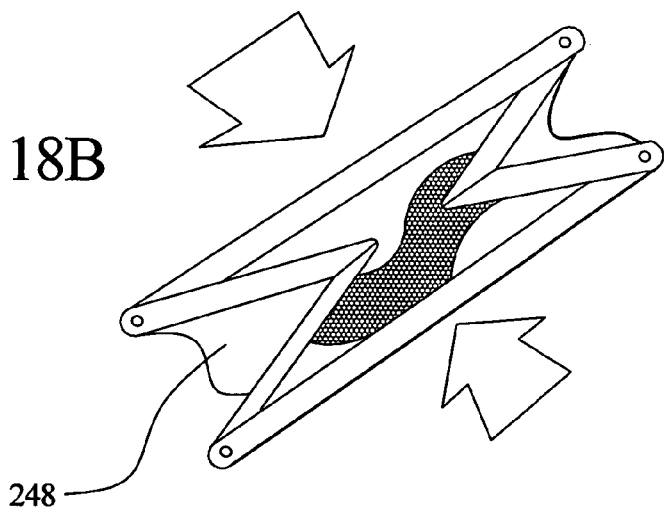

FIGS. 18A–18B illustrate another example of a transaction card 240 having a magnetic stripe 241. The transaction card 240 may be made from a fabric or other like material, so as to be bendable, foldable or otherwise flexible. A frame 242 having hinges 245 disposed in the corners of the frame 242 may be disposed around a periphery of the transaction card 240 to provide rigidity to the transaction card 240 and keep the transaction card 240 open in a full-sized state. One or more sides of the frame 242 may have slits and/or hinges 246 disposed therein such that the frame 242 may be collapsible to form a collapsed transaction card 248, as illustrated in FIG. 18B.

FIGS. 19A–19C illustrate another example of a shortened transaction card 250 having a magnetic stripe 251. The shortened transaction card 250 is subdivided into two parts 252a, 252b that are interconnected via a rotatable arm 254. The part 252b may be swung around from a first side 253 of the part 252a via the rotatable arm 254, as illustrated in FIG. 19B, and disposed on a second side 255 of the part 252a, thereby exposing the magnetic stripe 251 and forming a full-sized or otherwise larger transaction card 256. When the part 252b is disposed on the first side 253 of the part 252a, the magnetic stripe 251 may be hidden by the part 252, thereby protecting the magnetic stripe 251.

FIG. 20 illustrates another example of the present invention of a transaction card holder 260 that may be configured to hold a transaction card 262 therein. The transaction card holder 260 may be formed of a rigid material, such as metal or plastic, such that the transaction card 262 may be protected when disposed therein. An aperture 264 may be disposed on the transaction card holder 260 for clipping the transaction card holder 260 to a keychain or the like. The transaction card 262 may be slidable from the transaction card holder 260.

FIGS. 21 and 22A and 22B illustrate two more examples of transaction cards 270, 280, respectively. FIG. 21 illustrates a transaction card 270 having a housing 272 disposed on a side of the transaction card 270. Preferably, the housing is disposed to allow a magnetic stripe 271 to be accessible. The housing contains a light 274 and a switch or button 276 for activating the light 274. FIG. 22A illustrates a similar embodiment as that shown in FIG. 21, of a transaction card 280 having a housing 282 that is disposed on substantially an entire half of the transaction card 280, except for a magnetic stripe 281. The housing may have a light 284 and a button 286 for activating the light 284 for use as a flashlight, as illustrated in FIG. 22B. Alternatively, the lights 274, 284 may be on at all times, or only when in a darkened place to allow the transaction cards 270, 280 to be easily locatable, such as in a purse or bag. Alternatively, the housing and/or the transaction card may include a fluorescent material so as to be easily visibly locatable, such as when disposed within a purse or bag. Alternatively, the housing may also have a speaker or other sound emitting device (not shown) for signaling such that the transaction card 270 or 280 may be locatable if lost. In addition, the speaker or other sound emitting device may also emit an alarm that may be activated by an individual.

Figure 23C:
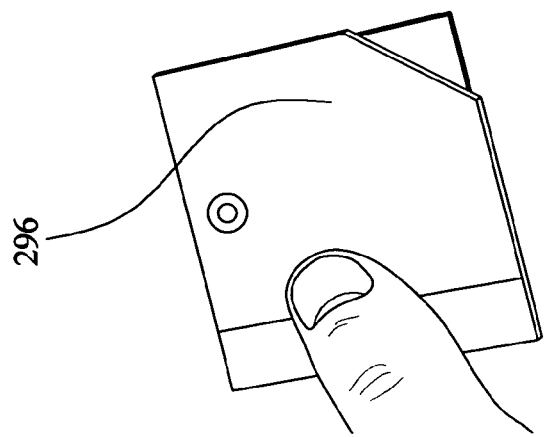
FIGS. 23A–23C illustrate an alternate example of a transaction card having separable sections attached to each other and rotatable around an axle.
Figure 23B:
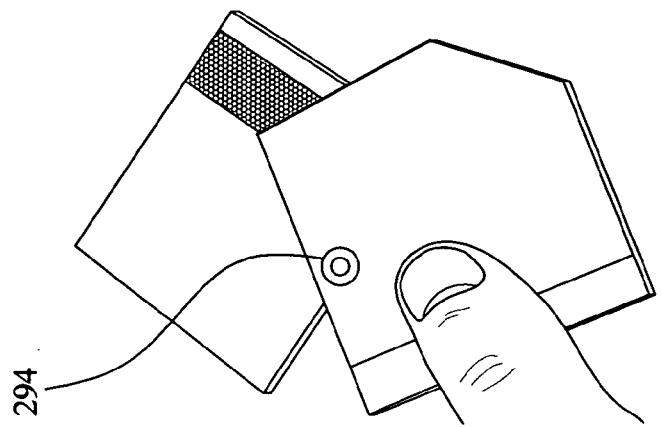
Figure 23A:
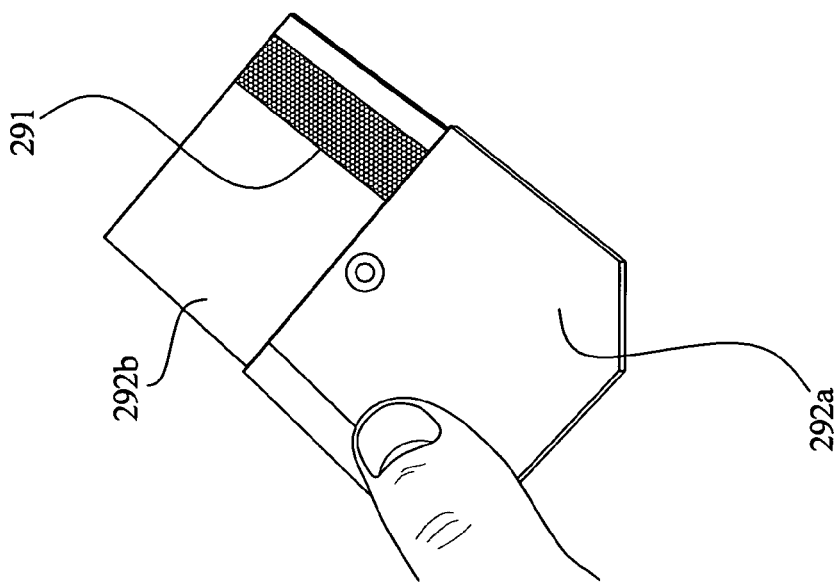

FIGS. 23A–23C illustrate another example of a transaction card 290 that may be subdivided into two parts 292a, 292b. A magnetic stripe 291 may be disposed on the transaction card, such as on one of the parts 292a or 292b. The part 292a may be interconnected to the part 292b via a rotatable axis 294 that may allow the part 292b to rotate, as illustrated in FIG. 23B, such that the faces of the parts 292a, 292b are disposed adjacently to form a closed transaction card 296, as illustrated in FIG. 23C. This allows the transaction card 290 to be of a smaller size until needed. When rotated to form the closed transaction card 296, such that the faces of the parts 292a, 292b are adjacent, the magnetic stripe 291 may be protected.

While the foregoing has described what are considered to be the best mode and/or other examples, it is understood that various modifications may be made therein and that the technology disclosed herein may be implemented in various forms and examples, and that they may be applied in numerous applications, only some of which have been described herein. It is intended by the following claims to claim any and all modifications and variations that fall within the true scope of the advantageous concepts disclosed herein.

We claim:

1. A transaction card comprising:
   a first section and a second section wherein said first section is connected to said second section via a rotatable element wherein said first section rotates with respect to said second section between a first position and a second position;
   wherein said rotatable element comprises an arm having a first end and a second end wherein the first end of the arm is rotatably attached to the first section and the second end of the arm is rotatably attached to the second section.

2. The transaction card of claim 1 where the first section is rotatable relative to the first section via rotation around the first end and second end of the arm.

3. The transaction card of claim 1 wherein the first section is rotatable around a first axis point on the first end of the arm, and the second section is rotatable around a second axis point on the second end of the arm.

4. A transaction card comprising:
a main card portion wherein said main card portion is flexible and is rollable into a tube; and
a plurality of scores in a face of the main card portion wherein said plurality of scores are disposed transversely across the face of the transaction card.

5. The transaction card of claim 4 further comprising:
a recordable medium on a surface of said transaction card.

6. The transaction card of claim 5 wherein said recordable medium comprises a magnetic stripe.

7. The transaction card of claim 5 wherein said recordable medium is a magnetic stripe disposed longitudinally across the face of said transaction card.

8. The transaction card of claim 7 wherein said plurality of scores are not disposed across the surface of said magnetic stripe.

9. The transaction card of claim 5 wherein the recordable medium is a microchip.

* * * * *

UNITED STATES PATENT AND TRADEMARK OFFICE
CERTIFICATE OF CORRECTION

PATENT NO. : 7,124,955 B2 Page 1 of 1
APPLICATION NO. : 10/436343
DATED : October 24, 2006
INVENTOR(S) : Ellen Lasch et al.

It is certified that error appears in the above-identified patent and that said Letters Patent is hereby corrected as shown below:

On Title Page insert the following:

Related U.S. Application Data should read

-- Provisional application No. 60/442,991 filed on January 28, 2003. --

Signed and Sealed this

First Day of July, 2008

JON W. DUDAS
*Director of the United States Patent and Trademark Office*